Patented Apr. 2, 1929.

1,707,941

UNITED STATES PATENT OFFICE.

JULIUS A. NIEUWLAND, OF NOTRE DAME, INDIANA, ASSIGNOR, BY MESNE ASSIGNMENTS, TO CANADIAN ELECTRO PRODUCTS COMPANY, LIMITED, OF MONTREAL, CANADA.

PHENOLIC CONDENSATION PRODUCTS AND MANUFACTURE THEREOF.

No Drawing. Application filed July 25, 1921. Serial No. 487,466.

This invention relates to improvements in phenolic condensation products and in the manufacture of same and the object of the invention is to provide a process by means of which synthetic resin compositions may be made cheaply and expeditiously.

It is well known that synthetic resins may be formed by the action of phenol or its homologues on formaldehyde and that the initial products formed may by certain treatment be rendered infusible and insoluble to make their commercial use practicable.

According to this invention, synthetic resins of a nature similar to "Condensite," "Bakelite," etc. may be made by the direct action of acetylene on phenol or its homologues in the presence of a suitable catalyst and under suitable conditions of pressure and temperature.

In carrying out the invention, the catalyst, preferably a salt of mercury, is mixed with a small amount of strong acid, such as sulphuric acid, and added to the phenol preferably in concentrated form. Acetylene gas is then passed into the mixture, which is preferably maintained at a temperature between 50 and 120° C., although a much greater range of temperature is permissible and to some extent commercially practicable. The temperature may be regulated by external cooling or by the rate of acetylene admission or by both. The reaction medium should preferably be anhydrous or as nearly anhydrous as possible, although this is not absolutely essential since the reaction will take place in the presence of a small amount of water but with lower percentage conversion. The reaction is preferably carried out at atmospheric pressure but it may be carried out at pressures above or below atmospheric and either continuous or in any suitable way varied during the continuance of the reaction.

On the passage of acetylene into the reaction mixture, with suitable heating if necessary, the reagents present are combined into a resinous body, which depending on the percentage of reaction, is either solid or semi-solid on cooling.

The reaction may be conducted using a solvent for the phenolic body and, for this purpose, there may be used glacial acetic acid, an alcohol (not necessarily monohydric, acetone or any other liquid in which the phenolic body is soluble and which has no detrimental effect on the reaction or product. The solvent may be removed after reaction by distillation or in any other suitable way. The catalyst may be as far as can be determined sulphuric acid and any of the salts of mercury, but preferably one of the following;— mercurous oxide, mercuric oxide, mercurous sulphate, mercuric sulphate. As already stated, the presence of water in limited quantity does not prevent the reaction but the reaction should be as nearly as possible water-free and to this end the anhydrous forms of the acid, i. e., sulphuric anhydride may be conveniently used.

The reaction is preferably carried out under atmospheric pressure but superatmospheric pressures may be used to advantage for all temperatures and especially if higher temperatures, i. e., in the neighborhood of 200° C. or over, are used, to avoid boiling away the phenol or the homologue used. The pressure limit is only that imposed by the explosion hazard of compressed acetylene.

The following examples serve to illustrate the application of the invention;—

Example I.

3 parts of dry mercuric sulphate is treated with 28 parts concentrated sulphuric acid. This mixture is then added to 200 parts phenol. Dry acetylene is now passed into the mixture, maintaining the temperature at from 50° to 120° C. but preferably 90° C. to 110° C. The gas is absorbed rapidly, the period of reaction being only about 30 minutes for laboratory quantities. Approximately 36 parts of acetylene are absorbed and the material in the flask is a resinous body which on cooling becomes solid or semi-solid.

Example II.

3 parts of dry mercuric sulphate is treated with 28 parts concentrated sulphuric acid. This mixture is then added to 200 parts of commercial cresol. Dry acetylene is now passed into the mixture, maintaining the temperature at from 50° to 120° C. but preferably 90° C. to 110° C. The gas is absorbed rapidly, the period of reaction being only about 30 minutes for laboratory quantities. Approximately 34 parts of acetylene are absorbed, and the material in the flask is a resinous body which on cooling becomes solid or semi-solid.

*Example III.*

Same as Example I except that a pressure of 50 lbs. per sq. in. is maintained in the reaction flask.

In the examples cited above in which the proportions are by weight, many variations may be made without departing from the spirit of the invention; for example, in commercial practice it is found desirable to place the reflux condenser over the reaction vessel. The phenol escaping with the excess acetylene is thus condensed and returned to the reaction chamber. The excess acetylene may be then returned by means of a pump, or other suitable means, into the reaction vessel again. In fact, in commercial practice it is found that it is advisable to use considerable excess of acetylene. The amount of sulphuric acid may also be varied, particularly downwardly, with good results.

In any of the above examples, in place of sulphuric acid, one of the acid salts of sulphuric acid may be used with good results.

The resin obtained when working according to the previous examples is both fusible and soluble and is therefore of little commercial value. It may, however, be rendered hard infusible and insoluble by any suitable method, such as treatment with materials such as hexamethylenetetramine under suitable conditions of heat and pressure. Any excess phenol present may be removed by distillation before treatment with the hardening agent.

The methods of hardening known synthetic resins by treatment with methylene containing hardening agents are well understood in the art and detailed description thereof is unnecessary. Substantially the known conditions obtain in the present invention as regards the hardening step, that is, the hardening agent is added in suitable amount to the initial fusible and soluble product and renders the same hard, infusible and insoluble, by heat or by heat and pressure treatment, to a degree corresponding to the amount of hardening agent used and the heat and pressure, if any. Suitable solvents for the phenol or other phenolic body may be used for the purpose of expediting the reaction or for any other purpose desired; the requirements of the material being that it dissolves the phenolic body used and have no undesirable detrimental effect on the action of the acetylene. Such solvents may be removed after the reaction has taken place by any well known or suitable method.

In the following claims it will be understood that the term "phenolic body" is deemed to include both phenol and its homologues and the term "sulphuric acid" to include both sulphuric acid and its anhydride.

Having thus described my invention, what I claim is;—

1. A process for the manufacture of synthetic resins which comprises bringing together phenol and acetylene in presence of a catalyst.

2. A process of making synthetic resins which comprises bringing together phenol and acetylene in presence of a mercury compound as catalyst.

3. A process of making synthetic resins which comprises bringing together phenol and acetylene in presence of sulphuric acid and another catalytic agent.

4. A process of making synthetic resins, which comprises bringing together acetylene and phenol in presence of sulphuric acid and a compound of mercury.

5. A process of making synthetic resins, which comprises bringing together a phenolic body in solution and acetylene in presence of a catalyst, and after reaction removing the solvent.

6. A process of making synthetic resins which comprises passing acetylene into a solution of a phenolic body containing sulphuric acid and a salt of mercury, and removing solvent from the formed product.

7. A process of making synthetic resins, which comprises passing acetylene into a phenolic body containing a catalyst and maintaining a temperature between 100° and 200° C.

8. A process of making synthetic resins, which comprises passing acetylene into a phenolic body containing sulphuric acid and a salt of mercury, and maintaining the temperature between 100° and 200° C.

9. A composition of matter resulting from the reaction of acetylene and phenol.

10. A composition of matter comprising a condensation product of acetylene and a phenolic body and a hardening agent.

11. A composition of matter comprising a fusible potentially reactive product resulting from the reaction of acetylene and a phenolic body, and a hardening agent, said composition being convertible by heat into an infusible body.

12. A composition of matter comprising a condensation product of acetylene and a phenolic body, and hexamethylenetetramine as a hardening agent.

13. A process of making resins which comprises reacting together phenol and a body containing the group —C≡C— in the presence of a catalyst.

14. A process of making resins which comprises reacting together phenol and a body containing the group —C≡C— in the presence of a sulphuric acid and a mercury compound.

15. A process of making resins which comprises reacting together a phenolic body in solution and acetylene in the presence of a catalyst and after the reaction removing the solvent.

16. A process of making resins which comprises reacting together a phenolic body in solution and acetylene in the presence of sulphuric acid and a mercury compound and after the reaction removing the solvent.

17. The process of claim 16 in which the solvent is acetone.

18. A potentially reactive resinous composition comprising the reaction product of acetylene and phenol together with a hardening agent, said composition being convertible by heat into an infusible body.

19. A substantially infusible and insoluble hardened resin comprising a reaction product of acetylene and phenol.

20. A process of making synthetic resins, which comprises reacting together phenol in solution and acetylene in presence of a catalyst and after reaction removing the solvent.

21. A process of making synthetic resins, which comprises reacting together phenol in solution and acetylene in presence of sulphuric acid and a salt of mercury and after reaction removing the solvent.

22. A process of making synthetic resins, which comprises reacting together phenol and acetylene in presence of a catalyst, while maintaining a temperature between 50° and 200° C.

23. A process of making synthetic resins, which comprises reacting together phenol and acetylene in presence of sulphuric acid and a salt of mercury, while maintaining a temperature between 50° and 200° C.

24. A process of making synthetic resins, which comprises reacting together a phenolic body in solution and a body containing the group —C≡C— in presence of a catalyst.

25. A process of making synthetic resins, which comprises reacting together a phenolic body in solution and a body containing the group —C≡C— in presence of sulphuric acid and a salt of mercury.

26. A process of making synthetic resins, which comprises reacting together a phenolic body in solution and a body containing the group —C≡C— in presence of a catalyst, while maintaining a temperature between 50° and 200° C.

27. A process of making synthetic resins, which comprises reacting together of phenolic body in solution and a body containing the group —C≡C— in presence of sulphuric acid and a salt of mercury, while maintaining a temperature between 50° and 200° C.

28. A composition of matter resulting from the reaction of a phenolic body and acetylene at a temperature of 100° to 200° C.

29. A composition of matter resulting from the reaction of a phenolic body and acetylene at a temperature of 100° to 200° C., subsequently treated with a hardening agent.

In witness whereof, I have hereunto set my hand.

JULIUS A. NIEUWLAND.